Patented Nov. 2, 1926.

1,605,115

UNITED STATES PATENT OFFICE.

JOHN LEONARD KELLOGG, OF BATTLE CREEK, MICHIGAN.

METHOD OF OBTAINING COFFEE FLAVOR.

No Drawing. Application filed February 15, 1923. Serial No. 619,277.

This invention relates to an improvement in methods of obtaining coffee flavor and with respect to its more specific features to methods of obtaining de-caffeinized flavor. An object of the invention is to provide a method of obtaining coffee flavor in its natural state from the dry bean.

Another object is to provide a method of obtaining the flavor in its natural combination with caffeol or caffeone.

Another object is to provide a method of obtaining the caffeone or caffeol from the bean without liberating the caffeine from the cellulose structure.

Another object is to provide a method of obtaining the flavor in a condition suitable for immediate use.

Another object is to provide a method of obtaining the flavor in a form such that it will not deteriorate with age.

Another object is to provide a method of obtaining the flavor in a form free from deleterious effects.

Another object is to provide a method of mechanically de-caffeinizing the caffeone or caffeol after it has been removed from the bean.

Other objects will be in part obvious and in part pointed out hereinafter.

The invention accordingly consists in the several steps and the relation and order of one or more of such steps with relation to each of the others thereof, which will be exemplified in the hereinafter disclosed method and the scope of the application of which will be indicated in the claims that follow.

It is known that oil will retain the volatile essences upon which flavor is dependent much longer than any other medium, as for instance, spirits or water. This is recognized in the making of attar of roses, for instance, wherein the distillate is condensed and allowed to drop in melted grease, which holds the very delicate odor of the roses. The caffeone or caffeol carries the flavor of the coffee, and when the caffeone or caffeol is extracted from the coffee, in its natural state, it carries a large amount of the flavor, and retains it with but little loss for long periods.

In the present invention, I remove the caffeone or caffeol by subjecting the bean, either green or roasted to pressure, sufficient to express the caffeone or caffeol. Thus I obtain the essential oil or caffeol in its natural state, without the admixture of any foreign material. The coffee may be ground or partially disintegrated before compressing, and preferably it is roasted, since roasting develops the aromatic caffeone, and liberates a portion of the caffeine from its combination with the caffeetannic acid. This caffeone or caffeol may be used to flavor coffee essence or extract, ice creams, confections and the like, or for cooking purposes.

The caffeol or caffeone may be de-caffeinized after extraction from the bean, in any suitable manner as for instance by a centrifuge. In extracting in this manner, the caffeone or caffeol is cooled before it is placed in the centrifuge. By the operation thereof the oil is thrown out, the caffeine crystals remaining in the receptacle. The crystals may be purified by washing in the centrifuge, after the caffeol or caffeone has been separated. By this process, no solvents for the caffeine, which tend to injure the flavor, are necessary.

From 1 to 2% of the product, whether or not de-caffeinized, may be added to dry soluble extractive material from cereals or the like, and a true coffee flavor obtained. This dry soluble extractive material may be obtained from cereals, or from de-flavorized coffee, which may or may not be de-caffeinized. A greater per cent of flavor may be used if desired, but the amount specified will usually be sufficient. The flavor in the form of volatile essences is carried by the expressed oil, caffeol or caffeone, and since there is no admixture of foreign matter, and the oil is in its natural state, as well as the essences, they are retained by the oil and the product does not readily deteriorate. Pressure is applied to the bean in any suitable or desired manner, and preferably with as little as possible heating of the bean, which tends to liberate the caffeine from the cellulose structure.

The temperature of the bean when the pressure is applied is relatively low, not usually exceeding 150° F. after expression. The crude coffee flavor, that is the caffeone or caffeol just expressed, contains a portion of foots or fine particles of coffee. This crude product as it leaves the press and before filtration, or before it is separated by centrifugal action, contains approximately 4/10ths of 1% of caffein. Ordinary coffee contains from 1% to 1½% of caffein. In utilizing the improved flavor, however, approximately 2% of the flavor is added to the material which is to be flavored, and this would reduce the percentage of caffein in the beverage to 8/1000ths of 1%. A product containing less than 5/100ths of 1% is considered harmless. When the improved coffee flavor is cooled to 54° F., and centrifugal separation made, the filtered out portions of the flavor contain less than $\frac{2}{10}$ths of 1% of caffein. If this product were used at the ratio of 2% in flavoring, the beverage would contains less than 4/1000ths of 1%. It is possible to reduce the caffein content of the crude oil to 11/100ths of 1% by the use of refrigeration and centrifuge. When 4% of this material is used to flavor the dry soluble product, the caffein is reduced to 0.0044%. The improved flavor, that is the caffeone or caffeol may be added to whole grain coffee, ground coffee or cereal coffee substitutes, and marketed in this form.

As many changes could be made in carrying out the above process without departing from the scope of the invention, it is intended that all matter contained in the above description shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. A method of obtaining coffee flavor, which includes expressing essential oils from coffee by pressure alone, while maintaining the coffee and flavor at a moderate temperature.

2. A method of extracting coffee flavor, which includes expressing essential oils from roasted disintegrated coffee beans by pressure alone, the essential oils being maintained at a moderate temperature throughout the process of extraction thereof.

3. A method for obtaining coffee flavor, which comprises roasting and disintegrating coffee and extracting the caffeol and aroma therefrom by pressure alone at a temperature of about 150° C.

4. A method for obtaining coffee flavor, which comprises roasting and disintegrating coffee and extracting the caffeol and aroma therefrom by pressure alone, cooling the product, and centrifuging.

5. A method for obtaining coffee flavor, which comprises roasting and disintegrating coffee and extracting the caffeol and aroma therefrom by pressure alone, cooling the product to a temperature of about 54° F., and centrifuging.

In testimony whereof I affix my signature.

JOHN LEONARD KELLOGG.